Aug. 6, 1968     F. J. CALLAHAN, JR     3,395,457

ASSEMBLY DEVICE

Original Filed July 13, 1964     2 Sheets—Sheet 1

INVENTOR.
FRANCIS J. CALLAHAN, JR.
BY
*Fay & Fay*
ATTORNEYS

Aug. 6, 1968   F. J. CALLAHAN, JR   3,395,457
ASSEMBLY DEVICE
Original Filed July 13, 1964   2 Sheets-Sheet 2

INVENTOR.
FRANCIS J. CALLAHAN, JR.
BY
Fay & Fay
ATTORNEYS

United States Patent Office 3,395,457
Patented Aug. 6, 1968

3,395,457
ASSEMBLY DEVICE
Francis J. Callahan, Jr., Chagrin Falls, Ohio, assignor to Crawford Fitting Company, Cleveland, Ohio, a corporation of Ohio
Original application July 13, 1964, Ser. No. 382,132. Divided and this application Oct. 4, 1965, Ser. No. 510,132
2 Claims. (Cl. 33—174)

This application is a division of application Ser. No. 382,132, filed July 13, 1964, now Patent No. 3,255,521.

This invention relates to a method of assembling a tube and a fitting. More specifically, the invention relates to a method of assembling a tube to a fitting of the type that is sealingly engaged upon the tube by means of swaging.

A fitting of the type referred to, which is secured to the tube by means of a swaging action, generally comprises a coupling body member which contains one or more tapered ferrules and a coupling nut in threaded engagement with the coupling body. As the coupling nut is advanced on the coupling body, the ferrules are subjected to axial pressure and are forced into a tapered mouth in the coupling body thereby causing them to contract upon the tubing. The coaction of the coupling nut and the ferrules, as will be discussed in more detail hereinafter, causes radial contraction of the ferrules to create a clinching grip on the tube by means of the swaging action of the ferrules thereupon. Since the contraction of the ferrules upon the tube is produced by an advancement of the coupling nut along the coupling body, it will be apparent that the amount of contraction of the ferrules is determined by the amount of advancement of the coupling nut.

In making an effective and tight connection between a tube and this type of fitting, it is important that the dimensional relationships between the tube itself and the various components of the fitting, do not vary appreciably from those prescribed. Deviations from the prescribed tolerances for any of the components may sometimes result in unsatisfactory connections.

In its broadest sense, the invention relates to a method of assembling a tube and a fitting of the aforementioned type wherein the dimensional characteristics of the tube must be correlated with those of the fitting to produce an effective connection. More specifically, the invention relates to a method of assembling this type of fitting to a tube in a manner which will produce a more or less constant amount of swaging or tube deformation, notwithstanding significant variations, within tolerances, of tube dimensions.

The novel method, according to the principles of the invention, generally is adapted for use in connection with a fitting of the general type wherein a coupling nut is advanced on the coupling body, thereby to contract one or more ferrules contained in the coupling body into gripping relation with the tube wall. An example of such a fitting is disclosed in U.S. Patent No. 3,103,373, issued Sept. 10, 1963 to Fred A. Lennon and Emery J. Zahuranec, and assigned to the same assignee as the present application.

The invention disclosed and claimed in the aforementioned patent includes an embodiment in which the pitch of the threads interconnecting the coupling body and the coupling nut was predetermined and selected so that one and one-quarter turns of the coupling nut from the finger-tight condition was required to deform the ferrules radially inwardly against the tube wall in an amount sufficient to obtain optimum gripping and sealing for low to intermediate pressures. One and one-half turns from the finger-tight condition proved particularly effective for pressures of somewhat higher order of magnitude.

These fittings generally comprise a threaded body portion having a fluid passage therethrough, adapted to receive a generally cylindrical elongated member, such as a tube, a thermocouple, or other rodlike male member. In those instances in which the male member to be gripped is a tube or the like, the passage is provided at one end with a coaxial counterbore having a bottom which forms a radially extending shoulder for engagement with the tube end. The passage also includes a coaxial tapered mouth which provides an annular camming surface adapted to cooperate with an annular ferrule.

The generally frustoconical annular ferrule is received by the tapered mouth of the camming surface. A second annular ferrule is received by the first frustoconical ferrule and is provided at its other extremity with a radially extending flange. Threadedly received upon the body member is a coupling nut, which includes a radially inwardly directed flange which cooperates with the outwardly directed flange of the second ferrule. As the coupling nut is advanced upon the coupling body, it engages the second or back ferrule and forces this against the front ferrule, which, in turn, causes the frustoconical or front ferrule to be forced into the tapered mouth of the coupling body. As the ferrules are driven forwardly, they move along the inwardly directed camming surfaces and thereby radially contract upon the external surface of the cylindrical member.

To a considerable extent, the successful utilization of couplings of the aforementioned type depends upon controlled constriction or swaging of the walls of the tubular member to be coupled. In fittings of this type, the optimum amount of tube wall constriction or swaging is a predetermined quantity. For a coupling of given design, a precise number of coupling nut turns, or fractions of turns, will be required to obtain the linear nut advancement necessary to produce the optimum amount of swaging. The pitch of the threads interconnecting the coupling nut and coupling body will in turn be determinative of the number of turns required to produce this linear advancement. If the coupling nut is given less than the prescribed number of turns, the ferrules will not be contracted or collapsed sufficiently to produce the required swaging of the tube wall. The insufficient swaging of the tube wall results in a connection which is susceptible to leakage. Should the coupling nut be advanced more than the prescribed amount, the annular ferrules will be over-contracted upon the tube wall. This excessive swaging may result in reducing the number of times the fitting can be disconnected and remade.

Accordingly, the fittings and the conduits or pipes to be used in connection therewith must be manufactured in accordance with relatively close tolerances, so that a given number of turns on the coupling nut will contract the ferrules a predetermined amount, thereby to produce the proper swaging of the tube wall.

In general, the problems which have been encountered are due either to deviations from the prescribed tolerances in the manufacture of the tubing, or the failure of the assembler to advance the coupling nut the prescribed amount, or both. Most often, the fitting itself is manufactured in accordance with the prescribed tolerances but difficulty is usually occasioned by deviations in the tolerances of the tube.

The use of these fittings with extruded members, such as plastic tubes, has been particularly troublesome due to significant variations from prescribed tolerances inherent from extrusion processes. In the instances where the outer diameter of the tube is larger than prescribed, and the coupling nut is rotated to the standard or prescribed amount, an excessive amount of swaging of the tube is produced. In the event the outer diameter of the tube is smaller than prescribed and the coupling nut is again rotated the standard amount an adequately swaged connection will result.

In an attempt to alleviate the problems of inadequate or excessive swaging which are specifically due to the failure of the user to advance the coupling nut the prescribed number of turns, various types of gauging means have been devised. These gauges are designed to indicate precisely the amount of advance of the coupling nut which is required to produce a secure connection between a properly dimensioned fitting and tube. One of these gauging devices amounts to an annular tightening limit member disposed between the coupling nut and a fixed surface on the body of the coupling. In use, the coupling nut would be rotated until its advance is arrested by the annual tightening limit member.

If both the fitting and the conduit are manufactured in accordance with predetermined tolerances, this method of assembly has been effective in giving the proper connection. It is significant to note that this technique of gauging merely controls the amount of contraction of the ferrules by limiting the advance of the coupling nut. An effective connection, however, requires a relatively definite amount of swaging of the tube walls and this is dependent upon the size of the tube as well as the amount of advance of the coupling nut. Accordingly, this technique of merely limiting the advance of the coupling nut is not reliable if the tube is larger or smaller than prescribed for the particular fitting involved.

Another method of assembling fittings of this type involves the insertion of a no-go gauge between the coupling nut and the body of the coupling. The coupling nut is then advanced to the no-go position. This method is attendant with the disadvantages noted supra regarding the annular tightening limit means in the event of dimensional variances in the tube diameter.

In addition to the disadvantages discussed supra, these methods of assembling cannot be practiced at all on certain types of fittings.

It will be observed that in using either the no-go gauge or the tightening limit means, which in effect is a no-go gauge, a reference surface must be provided upon the fitting. Certain types of fittings, however, such as T's and elbows, are not constructed with a reference surface thereon. Accordingly, these methods have no application whatsoever, where such fittings are involved.

With the foregoing problems in mind, it is an object of this invention to provide a method of assembling a swage action gripping device to a tube in a manner such that the amount of deformation or swaging of the tube wall is not affected by dimensional variations of the tube diameter.

It is a further object of this invention to provide a method of assembling swage action gripping devices to tubes which assures uniformly reliable connections without regard to variations between the dimensions of the fitting and the tube.

It is a further object of this invention to provide a method of assembling swage action gripping devices to tubes wherein the amount of advance of the coupling nut is not measured in terms of a precise number of turns or fractions thereof.

It is a still further object of this invention to provide a method of assembling a swage action coupling to a tube wherein the amount of advance of the coupling nut is not measured in terms of turns but in terms of the linear distance the coupling has been advanced on the fitting.

It is a still further object of this invention to provide a method of assembling fittings of the aforementioned types to tubes or conduits, wherein the necessary amount of constriction or swaging action for a particular size of conduit is predetermined in terms of the requisite linear travel of the coupling nut relative to the tube.

Another object of this invention is to provide a method of accurately controlling the required amount of linear travel of the coupling nut on the body of a swage action fitting which has no reference surface thereon for cooperation with a gauging means.

A still further object of the invention is to provide a method of assembling tubes or conduits to couplings of the aforementioned nature which includes the step of indicating on the tube or conduit itself the amount of advance of the coupling nut which is necessary to produce a prescribed connection.

Another object of this invention is to provide a number of gauging devices adapted to be used in a method of assembling couplings and pipes.

Another object of this invention is to provide a cup type gauging device which includes a generally cylindrical bore having the dimensions of depth and diameter thereof correlated with the design characteristics of a swage action gripping device.

A further object of this invention is to provide a series of cup type gauging devices each adapted for use in connection with corresponding sizes of tubes to indicate thereon the amount which the coupling nut of a given sized swage action type coupling must be advanced to produce a proper connection with a particular tube.

Another object of the invention is to provide a series of measuring devices or cap gauges each of which includes a generally cylindrical bore wherein the diameter of the bore and the depth thereof are interrelated to the pitch of the threads interconnecting the coupling nut to the coupling body and also to the various camming surfaces of the fitting which cooperate to swage the fitting to the tube.

Other and more specific objects of the invention will be apparent from the detailed description to follow and from the drawings.

In the drawings:

FIG. 1 also shows the relative positions of the various components of the swage action gripping device in the initial stages of assembly of the conduit;

Like parts are designated by like reference numerals in the several views of the drawings.

Figure 1:
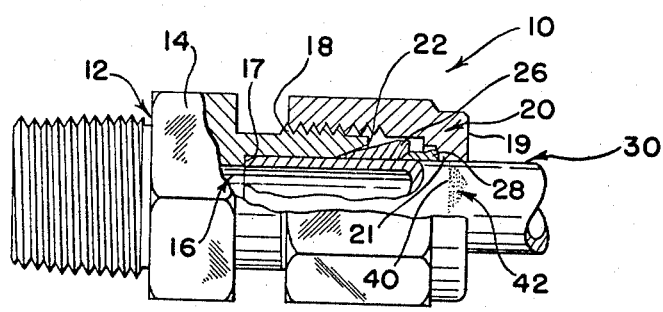
FIG. 1 is a fragmentary view, partly in longitudinal section, of a swage action gripping device of the type with which the instant method of assembly is generally concerned.

It is thought that the nature of the invention can be understood more easily by first considering certain details of the swaging or gripping type of fitting or coupling that is to be assembled to a tube or conduit. Referring now, more particularly, to the drawings, FIG. 1 shows a typical gripping or swaging action type coupling indicated generally at 10. The gripping device 10 includes a coupling body 12 which may be provided intermediate its ends with tool pads 14 or other wrench-engaging surfaces. Extending longitudinally through the body 12 is a substantially cylindrical passageway, designated generally at 16 and having a shoulder 17 against which tube 30 abuts.

Body member 12 is externally threaded at 18 to receive a coupling nut 20 which is internally threaded. The rear face of the coupling nut 20 is designated 19. In a typical example, the threads 18 probably would have a pitch of about 20 threads per inch. The body 12 also is provided with a tapered annular mouth 22 to receive a front ferrule 26. A second ferrule, or back ferrule 28, is held in a captive relationship between the front ferrule and an internal annular flange 21 formed on the unthreaded end of the coupling nut 20. Upon relative rotation of the coupling nut 20 and the coupling body 12, the generally tapered shape of the ferrules 26 and 28 cause a sequential inward gripping of the tube 30 as explained in detail in the above-mentioned Patent No. 3,103,373.

In a swage type fitting of the nature here involved, the amount of swaging or deformation of the pipe is very critical since too great a deformation or swaging will cause an internal obstruction in the pipe and create fluid flow problems as well as possibly a rupture of the pipe and assuredly a defective connection. An inadequate amount of swaging will produce an insecured fitting and allow leakage.

In practice, the various elements of the fitting are manufactured to extremely close tolerances and most are used in connection with tubing which is manufactured within very close tolerances. The coupling assembly is shipped to the user in finger-tight relation, and when used is slipped onto the tubing until the tube abuts against the seat of the coupling body.

Various ways and means have been used to control very accurately the amount of swaging or gripping between the coupling and the pipe. One technique has been to use a fixed gauge between the forward portion of the coupling nut 20 and the sides of the tool pads 14 and to rotate the nut until further advance is arrested by the gauge. Another practice has been to rotate the coupling nut a prescribed amount. When the prescribed tolerances of all the critical elements in the fitting, as well as the dimensions of the pipe are adhered to accurately, the aforementioned methods of assembly have generally proved adequate. Difficulty arises, however, if the outer diameter of the pipe is not maintained, as predescribed. In certain grades of commercially available tubing, and particularly plastic tubing, prescribed tolerances are not adhered to and difficulties arise in using swage type couplings with such conduits.

This invention contemplates a method of consistently producing proper connections between swage type couplings and tubes which deviate somewhat in the external dimension from prescribed tolerances.

Figure 2:
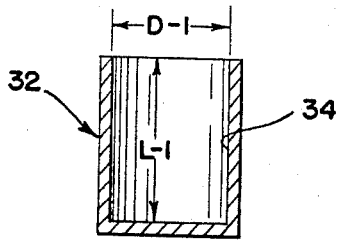
FIG. 2 is a sectional view of a gauge device used in the practice of this invention.

Referring now to FIG. 2, applicant has provided a cup-shaped gauge device indicated generally at 32, with the depth of the generally right cylindrical bore 34 of the cup being precisely dimensioned L–1, and the diameter of the bore being precisely dimensioned D–1. The relationship between the dimensions L–1 and D–1 are selected in accordance with the linear nut travel required to produce optimum swaging, and, in turn, in accordance with the pitch of the threads 18 of the coupling and the design of various coacting camming surfaces on the front and back ferrules and on the angular tapered mouth 22 for a particular fitting.

Figure 3:
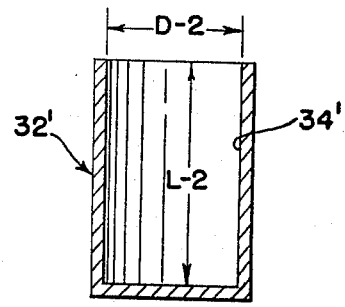
FIG. 3 is a sectional view of a gauging device, identical in design to that illustrated in FIG. 2, but differently dimensioned, used in the practice of the instant method.
Figure 4:
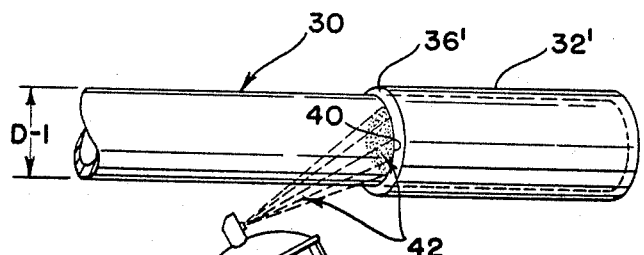
FIG. 4 is a perspective view of a gauging device, as shown in FIGS. 2 and 3, when used in connection with a conduit for marking the pipe or conduit in accordance with the teachings of the invention.

FIG. 3 illustrates a gauge device similar to that shown and described in FIG. 2 with corresponding elements being indicated by corresponding primed numerals. Corresponding dimensions of the cup-type gauge of FIG. 3 are demoted by D–2 and L–2, which are selected in the same manner as were L–1 and D–1 described above in relation to the cap gauge of FIG. 2. The respective cap gauges are of similar design but have bores of different diameters and depths. For purposes of illustration, the dimensional relationship between the depth and diameter of the respective bores is exaggerated. It will be noted in visually comparing the respective gauges, that both the depth and diameter of the cap gauge of FIG. 3 are greater than corresponding dimensions of FIG. 2. The significance of this dimensional relationship will be discussed in more detail hereinafter.

In practicing the method of applicant, a cup-type gauge 32 is selected to fit snugly over the outer surface of a tube 30. If the particular tube to be used has an outside diameter of D–1, a gauge with a bore diameter of D–1 is selected and inserted upon the tube until it bottoms in the lowermost part of the bore 34. With the cup gauge 32 bottomed snugly over the tube 30, a mark is made, as by an aerosol can 38 containing a marking compound 42, possibly paint, at the juncture of the upper face of the gauge and the tube 30. Scribing, or any other suitable method of marking may be used. The juncture of the gauge and the tube or pipe 30 is indicated by reference numeral 40.

Figure 5:
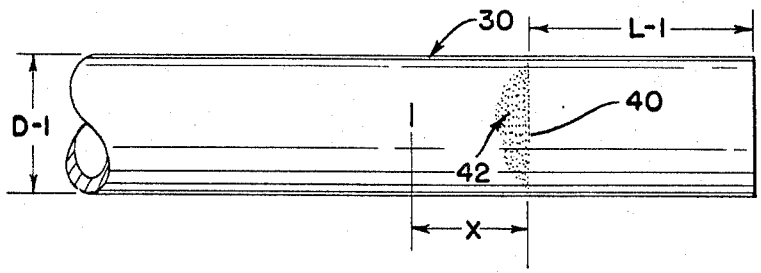
FIG. 5 is a fragmentary view of the conduit shown in FIG. 4 after having been marked in accordance with the principles of the instant invention.

In FIG. 5 there is shown a tube 30 having an outer diameter of D–1 and a marking 42 thereon at a point 40 which is located a ditsance L–1 from the end thereof as dictated by the depth L–1 of the bore 34 of gauge 32. In selecting the proper gauge, should it have been found that the tube 30 had an external diameter of D–2, gauge cup 32′ would have been used for marking the pipe and the juncture 40 and corresponding mark 42′ would have been a distance L–2 from the end of the pipe.

Figure 6:
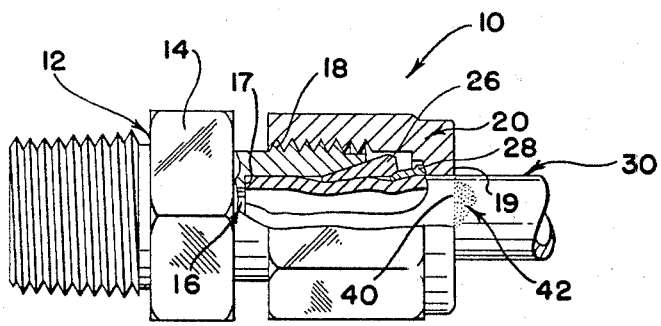
FIG. 6 is a fragmentary view, partly in section, showing the completed connection between the swage type fitting or coupling device and the conduit in accordance with the principles of the invention.

Referring again to FIG. 1, the tube 30 which has been marked in accordance with the above-described procedures is inserted into the fitting 10 and abutted against shoulder 17. To complete the connection the coupling nut 20 is advanced upon the coupling body until the face 19 of the nut overlies the point 40 on the tube as illustrated in FIG. 6. As the coupling nut is rotated, the back ferrule 28 is driven against the tapered mouth of the front ferrule 26 and, by force transmitted through the back ferrule, the front ferrule is driven into the tapered mouth 22 of the body. As the ferrules are driven forwardly they are cammed radially inwardly against the external surface of the male member, thereby swaging the latter and interlocking fitting and tube.

To produce consistently the correct amount of swaging, the coupling nut must be advanced a lesser amount when an oversized tube is being used than when an undersized tube is used. Accordingly, if the bore diameter of one gauge cap is greater than that of another gauge, the bore depth of the one gauge will also be greater than that of the other. Therefore, the proper selection and use of the various gauges will position the juncture 40 at a greater distance from the end of the tubes as the tubes increase in diameter, thereby to indicate less advance of the coupling nut for larger tubes.

Figure 7:
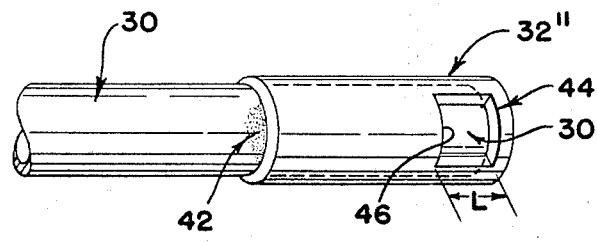
FIG. 7 is an alternative embodiment of the invention specifically adapted to visually indicate whether or not the gauging device is properly applied to the tube.

It will be apparent that in practicing the present method the tube must be properly bottomed in the cap gauge. Generally the skilled user can ascertain by the "feel" of the gauge whether or not the tube is properly bottomed. However, to avoid the necessity of relying upon the experience and skill of the user, there may be provided a modified, or alternative, form of cap gauge 32″, as shown in FIG. 7, which permits a visual observation of the condition of the tube with respect to the gauge.

The cap gauge 32″ includes an opening or window 44 therethrough to permit a visual observation of the relationship between the end of the tube and the bottom of the cap gauge. The opening 44 is flush with the bottom of the bore in the cap gauge and extends longitudinally thereof a distance to allow the user to observe easily the fit of the tube in the gauge. After the tube is properly positioned in the gauge 32″ the tube may be marked with a material 42 and assembled with a swage type fitting in the manner described hereinabove.

As a further modification of applicant's method and apparatus the upper extremity 46 of the opening 44 may be positioned a distance L from the bottom of the bore. The mark or other indicia would then be placed on the tube at the point where it intersects the face 46 of the opening. In practicing this latter embodiment of the invention it is preferred to place the mark on the tube by means of a scribe or some other instrument instead of a coating material, such as paint. The continued use of paint, or equivalent material, with the cap gauge 32" of FIG. 7 eventually will affect the necessary surface properties of the bore.

In the present method as described above the rear face 19 of the coupling nut 20 is advanced until it precisely intersects, or overlies, the point marked 40 on the tube. In certain cases, however, the point 40 could be placed on the tube at a distance from the end thereof corresponding to distance L–1 plus an arbitrary but fixed distance X, for example. In the latter case the coupling nut would be advanced until face 19 thereof is the distance X from the point 40 indicated on the tube, as measured by a gauge. Such a gauge might be a fixed gauge having a thickness equal to X.

The invention has been illustrated above in connection with a particular fitting having a coupling nut which includes a face 19 thereon. This face 19 is utilized as a reference surface in the foregoing illustrations. The method of applicant could also be practiced by using other reference surfaces that might be provided on a coupling nut.

The invention claimed is:

1. A gauging device for use in connection with the assembly of a male member and a coupling of the type which comprises a coupling body having a bore therein, said bore including a tapered mouth, a tapered ferrule in the tapered mouth, and a coupling nut threadedly engaging the coupling body and in force transmitting engagement with the ferrule so that a prescribed amount of rotation of the coupling nut upon the coupling body will force the ferrule a given distance into the tapered mouth causing the ferrule to contract radially upon a male member disposed in the bore thereby to produce the desired connection with the coupling, comprising a series of cup type gauges each having a generally right cylindrical bore therein adapted to receive a male member, the bore of each of the cup type gauges being provided with an opening through the wall thereof which extends longitudinally from the bottom of the bore, the relationships between the depth and diameter of each bore being selected so that the point of intersection of the bore of the gauge with a male member of substantially the size of the bore and received therein will indicate said prescribed amount of rotation of the coupling nut required to produce the desired magnitude of ferrule contraction upon said male member.

2. A gauging device for measuring the amount of radial contraction required to secure a male member within a coupling of the type which comprises a coupling body having a bore therein, said bore including a tapered mouth, a tapered ferrule in the tapered mouth, and a coupling nut threadedly engaging the coupling body and in force transmitting engagement with the ferrule so that a prescribed amount of rotation of the coupling nut upon the coupling body will force the ferrule a given distance into the tapered mouth causing the ferrule to contract radially upon a male member disposed in the bore to thereby produce the desired connection with the coupling, said gauging device comprising a plurality of cup type gauges, each gauge having a generally right cylindrical blind bore therein with the bottom thereof being generally normal to the walls of the bore, the dimensions of depth and diameter of the bore in each cup type gauge being dictated by the depth of the bore of said coupling body, the degree of taper of the tapered mouth, the degree of taper of the tapered ferrule, and the pitch of the threads between the coupling nut and the coupling body, so that the point of intersection of the bore of a given cup type gauge with a given male member of substantially the size of the bore and received therein will indicate the prescribed amount of rotation of the coupling nut required to produce the desired magnitude of ferrule contraction upon the said male member, the dimensions of bore depth and the dimensions of bore diameter of any particular gauge being either greater or lesser than the corresponding dimensions of any one of the other gauges of the gauging device.

References Cited

UNITED STATES PATENTS 1,025,255   5/1912   Driver _____ 33—178 X

FOREIGN PATENTS 1,506   3/1863   Sardinia.

SAMUEL S. MATTHEWS, *Primary Examiner.*